Aug. 5, 1969     R. W. STUART     3,459,033

CRYOGENIC CONTAMINATION MEASURING APPARATUS

Filed Nov. 9, 1965

*INVENTOR.*
Robert W. Stuart

BY

*Attorney*

United States Patent Office 3,459,033
Patented Aug. 5, 1969

3,459,033
CRYOGENIC CONTAMINATION MEASURING APPARATUS
Robert W. Stuart, Wakefield, Mass., assignor, by mesne assignments, to 500 Incorporated, Cambridge, Mass., a corporation of Delaware
Filed Nov. 9, 1965, Ser. No. 506,999
Int. Cl. G01n 25/14
U.S. Cl. 73—25                    4 Claims

ABSTRACT OF THE DISCLOSURE

Apparatus for sensing the presence of very small quantities of contaminants in gases. Two capillary sections joined in series through an intermediate section are matched to have equal impedances in a warm state. When the capillaries are cooled the measurement of fluid pressure in the intermediate section becomes an indication of the contaminants solidified in the first capillary section.

---

This invention relates to apparatus for determining the presence of contaminants in a gas and more particularly to apparatus for determining the presence of contaminants in the high-pressure helium line of a helium refrigerator or liquefier.

In the operation of a helium refrigerator or liquefier it is necessary to use helium gas which is free from all contaminants, i.e., moisture, $CO_2$ and the like, since all such gases have freezing points above the temperature at which helium is liquefied. Thus, for example, any quantity of moisture or methane can readily plug the high-pressure helium lines and even more readily plug the Joule-Thomson expansion valve in which liquefaction of the helium takes place. It is therefore necessary to be able to continuously monitor helium gas or any other cryogenic gas to determine the presence of contaminants and to continuously determine any rate of build up of contaminants in the gas. In addition there are a number of other applications where it would be highly desirable to be able to monitor a gas for contaminants. For example, it is sometimes necessary to measure the cleanliness of lubricating oil and this can be done by bubbling a gas through it and determining whether or not the gas carries with it any contaminants. It may also be desirable to be able to measure the cleanliness of charcoal absorbers or of a piece of equipment itself. The apparatus of this invention makes such continuous monitoring possible and permits the detection of impurities in concentrations as little as a fraction of one part per million.

Many techniques, of course, are available for monitoring gas streams, but they are highly complicated and those which, for example, necessitate chemical or spectral analysis can not be carried out in the field. It would therefore be highly desirable to have an extremely accurate means for continuously monitoring a gas stream to detect the presence of very small amounts of contaminants, the apparatus being one which is simple in construction, capable of withstanding normal handling and adapted for use directly in the laboratory or in field operations.

It is therefore a primary object of this invention to provide a contamination monitoring apparatus, particularly useful in cryogenic applications. It is another object of this invention to provide apparatus of the character described which is simple and which can be employed directly in the laboratory, plant, or field. It is another object of this invention to provide a contamination detecting apparatus which is extremely sensitive to the presence of even very small quantities of contaminants. It is another object of this invention to provide a device which can be used to differentiate between different types of contamination. Other objects of the invention will in part be obvious and will in part be apparent hereinafter.

The invention accordingly comprises the features of construction, combination of elements and arrangement of parts which will be exemplified in the construction hereinafter set forth, and the scope of the invention will be indicated in the claims.

For a fuller understanding of the nature and objects of the invention reference should be had to the following detailed description taken in conjunction with the accompanying drawings in which FIG. 1 is a diagrammatic layout of the apparatus of this invention;

Figures 1, 2, 3, 4:
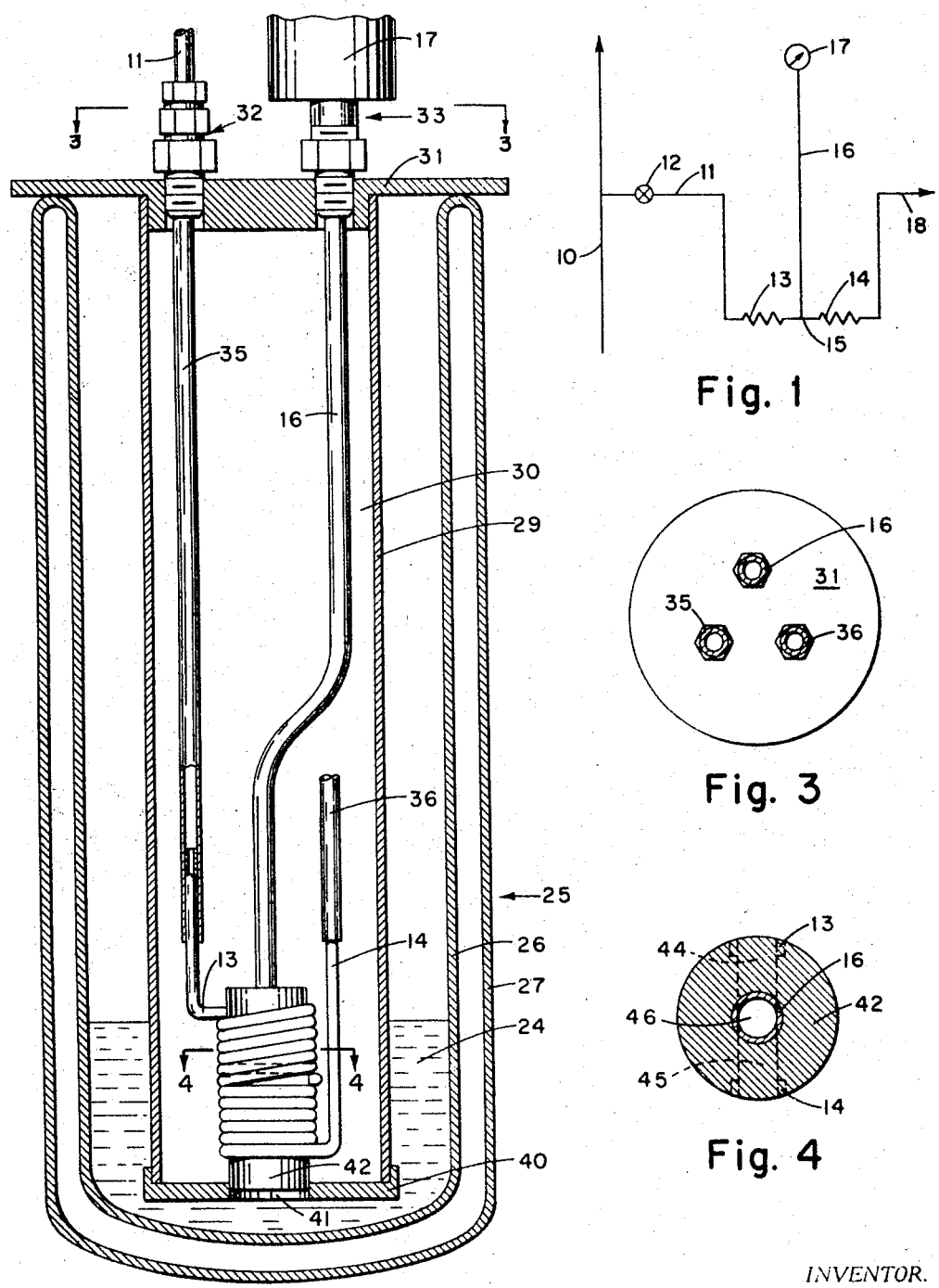
FIG. 2 is a longitudinal cross section through the apparatus of this invention.
FIG. 3 is a cross-section of the apparatus of FIG. 2 taken along line 3—3.
FIG. 4 is a cross-section of a portion of the apparatus of FIG. 2 taken along line 4—4.

Basically, the apparatus provides two capillary sections in series, the capillary sections being matched in impedances in the "warm" state. When the capillary sections are cooled to a temperature below that at which all of the contaminants which are to be measured solidify, but above the liquefaction or solidification temperature of the gas to be monitored, there is an accumulation of solidified contaminants in the first of the two capillaries in series. Such solidification, of course, leads to an increase in impedance, i.e., to an increase in pressure drop in the first of the capillaries. By providing means for measuring the pressure at a point intermediate between the two capillary sections, it is possible to determine the relative pressure drop in the two capillary tubes and hence to determine and measure the amount of solid contaminant build-up in the first. This then is a measure of the amount of contaminants present in the gas stream being monitored and this measurement can be converted directly into quantity of contaminants by calibrating the apparatus. This measurement can be used as a means to give suitable warnings when either the rate of contamination build-up exceeds a desired rate, or when total contaminant reaches a predetermined point.

The apparatus of this invention is shown schematically in the diagram of FIG. 1. For convenience the apparatus will be described in terms of monitoring a high-pressure helium line which leads into a helium liquefier such as that described in U.S.P. 2,906,101 and 3,151,466. High-pressure helium from a suitable purifying system is led to a liquefier, not shown, through conduit 10. This conduit is adapted for connection with a test drawoff line 11 which contains a suitable valve 12. This line, in turn, is connected to the first capillary section 13 which, in turn, is connected in series to a second capillary section 14. A suitable outlet conduit 18 communicates with the second capillary section 14 and may either lead to exhaust or may be connected to the low-pressure side of a helium liquefier. Such connections are not shown since they are not part of the invention. At a point 15 intermediate between the two matched capillary sections 13 and 14 a suitable conduit 16 is connected to communicate between this intermediate section 15 and a pressure gage 17. In operation the two capillary sections 13 and 14 are cooled to a temperature below the solidification point of the contaminants. This is conveniently done by immersing the capillary sections in a cryogenic fluid.

It will be seen from the schematic of FIG. 1 that if the high-pressure helium gas in conduit 10 contains vaporous contaminants, these will be frozen out and solidified on the inner walls of the first capillary section 13. The intermediate pressure of the gas at 15 will be proportional to the flow restriction of the two lines in their clean condition i.e., prior to the solidification of contaminants and this is determined as a reference for comparison. With the accumulation of solidified contaminants in the first capillary section 13 the change in pressure drop reflected by pressure gage 17 becomes a measure of the solidification build up in the first capillary section and hence a measure of the contaminants contained in the gas flowing therethrough. Since the contaminants are frozen out in the first capillary section the impedance or pressure drop in the second capillary section 14 remains relatively constant and so this second capillary section acts as a flow meter which means that there results in actuality a measurement of the rate of decline of flow from a constant-pressure source. Thus it is only necessary to continuously monitor the pressure gage 17 to monitor the presence of contaminants in the gas stream and the apparatus in reality runs itself.

Turning now to FIG. 2 it will be seen how this system is embodied in a suitable apparatus designed for use with a helium liquefier. Since the contaminants in helium will be primarily water vapor with perhaps small quantities of $CO_2$, methane and other light hydrocarbons, it is suitable to use liquid nitrogen as a coolant for the capillary sections. The liquid nitrogen 24, or other suitable cryogenic liquid, is conveniently contained within a Dewar type vessel 25, which in accordance with customary practice, is constructed of an inner wall 26 and an outer wall 27 which define an evacuated space therebetween. In the embodiment shown in FIG. 2 the capillary sections and their associated components are contained within a shielding 29 which is conveniently constructed from a stainless steel tubing. The volume 30 within the shielding 29 may contain air or may, if desired, be evacuated. The evacuation of volume 30 will, of course, provide additional insulation but this is normally not necessary.

A top flange 31 seals the shielding 29 and provides openings into which adaptors 32 and 33 can be inserted. Adaptor 32 provides for suitable connection between the sample drawoff line 11 and the connecting conduit 35 which slips over and is soldered to the first capillary section 13. A similar adaptor, not shown, is provided for the support and introduction of outlet conduit 18 which is connected to a connecting conduit 36 which is, in turn, in fluid communication with and soldered to the outlet end of the second capillary section 14.

The shielding 29 is closed at the bottom by means of a bottom flange 40, the center of which has a suitable hole 41 drilled in it to receive a copper plug 42 which serves as a heat sink and a suitable thermal connection between the liquid nitrogen coolant 24 and the capillary sections 13 and 14. This arrangement also provides thermal stability for the system and minimizes any fluctuations in the monitoring process which might be caused by fluctuation in the level of the cooling medium. The capillary sections 13 and 14 are wound around the copper plug 42 as shown. This plug 42 may, if desired, be drilled out in the bottom to reduce weight. Within plug 42 it is desirable to provide the necessary connection between the two capillary sections 13 and 14 and to provide the communication with the conduit 16 leading to the pressure gage 17. This is conveniently done, as illustrated in FIG. 4, by forming a T-joint in the copper plug 42. The T-joint is made by drilling holes 44 and 45 into which capillaries 13 and 14 are inserted and by drilling a third hole 46, along the axis of the plug 42 at its upper end, which connects with holes 44 and 45. Thus, the intermediate pressure tap 15 of FIG. 1 is in the embodiment of FIG 2 provided within the copper plug 42.

Both capillary sections should be of equal length and of the same diameter to give them matched impedances. It is desirable in constructing the apparatus of FIG. 2 to use capillaries having relatively small diameters. For example, an inside diameter of 0.005 inch has been found suitable for systems operating in the 150 to 300 p.s.i. pressure range. If capillaries having much larger diameters are used the system tends to become unstable since it is no longer possible for the solidified contaminants to bridge across the larger tubings and effect the necessary change in pressure drop. It is also desirable to make the connecting conduits 35 and 36 of tubing which is relatively large in diameter compared to the capillary diameter. Typically, these connecting conduits can be formed of 0.125 inch O.D. stainless steel tubing. It is also preferable that the connection between the capillaries and their respective connecting conduits be made as close to the copper plug 42 as possible. This also contributes to the stability of the apparatus since it assures that the pressure drop which is to be measured takes place only within the capillary section 13.

Although the apparatus of FIG. 2 has been shown to have a protective shield 29, it is possible in some cases to eliminate this protective shield and to immerse the capillaries wrapped about the copper plug 42 directly in a cryogenic fluid such as liquid nitrogen. However, this has the disadvantage that as the liquid nitrogen level goes down through evaporation and is brought up by the addition of more liquid nitrogen, the point of cooling of the capillaries also goes down and up and the performance of the apparatus tends to become slightly erratic and somewhat unstable. In addition to contributing to the stability of the performance of the apparatus, the shielding 29 provides physical protection for the connecting conduits, the capillary sections, and the thermal plug and makes the apparatus easier to handle and more adaptable to various applications.

It will be appreciated from the description of this apparatus that it may be calibrated by passing through the capillaries a gas at a known rate and containing a known quantity of contaminants. This may then serve as a basis for comparing the increase in pressure drop or the decrease in pressure registered by the pressure gage 17 thus providing a basis for measuring the presence of contaminants in a gas stream to be evaluated. An alternative way of using the apparatus is to monitor and note the decrease in pressure with time. This, of course, is an indication of whether one is working with a pure gas in which case the rate of pressure decrease is essentially zero or whether contaminants are present in which case the rate of pressure decrease is fairly constant .

It is also apparent that by using different cooling fluids it is possible to differentiate between contaminants which will freeze out at the coolant boiling point and those which will not. The use of numerous fluids either individually or in series will allow for a number of such differentiations.

The apparatus of this invention is very easy to use. All that is required is to connect the drawoff test line 11 (FIG. 1) into the main gas feed line 10, open valve 12 and observe the pressure gage 17. The gage may, of course, be suitably connected to any recording system which is not, of course, part of this invention. If the helium, or other gas is to be returned to the system then outlet conduit 18 is also connected to an appropriate low-pressure line in the system. No sample gas need be withdrawn for chemical or spectral analysis and of course the results of the monitoring as achieved by the apparatus of this invention are immediately and continuously available to an operator who may be a technician rather than a highly-skilled engineer.

It will thus be seen that the objects set forth above, among those made apparent from the preceding description, are efficiently attained and since certain changes may be made in the above construction without departing from the scope of the invention it is intended that all matter contained in the above description or shown in the accompanying drawings is to be interpreted as illustrative and not in a limiting sense.

It is also to be understood that the following claims are intended to cover all of the generic and specific features of the invention herein described and all statements of the scope of the invention, which as a matter of language, might be said to fall therebetween.

I claim:
1. An apparatus suitable for continuously monitoring a high-pressure gas stream for determination of the presence of gaseous contaminants therein, comprising in combination
    (a) first and second capillary sections having substantially equal impedances to gas flow at room temperature and being joined in series through an intermediate section;
    (b) pressure-measuring means in fluid communication with said intermediate section and responsive to changes in pressure drop across said first capillary section effected by the solidification of contaminants therein;
    (c) conduit means adapted to introduce said gas into said first capillary section and to withdraw said gas from said second capillary section; and
    (d) cooling means enclosing said first and second capillary sections for cooling contaminants in said gas below their solidification point.

2. An apparatus in accordance with claim 1 further characterized by having a thermal heat sink associated with said capillary sections whereby the temperature of said sections, when cooled, remains essentially stable.

3. An apparatus in accordance with claim 2 wherein said thermal heat sink is a copper plug around which said capillary sections are wound and through which they are connected in series.

4. An apparatus suitable for continuously monitoring a high-pressure gas stream for determination of the presence of gaseous contaminants therein, comprising in combination
    (a) an enclosing shielding means sealed at the bottom end at least partially immersed in a cryogenic fluid;
    (b) a thermal heat sink plug within said shielding means and mounted in the bottom thereof to make direct thermal contact with said cryogenic fluid;
    (c) first and second capillary sections having substantially equal impedances to gas flow at room temperature wound around in thermal contact with said heat sink plug and in fluid communication with each other internal of said plug at an intermediate joining point;
    (d) pressure-measuring means extending into said plug and in fluid communication with said capillary sections at said intermediate point; and
    (e) conduit means adapted to introduce said gas into said first capillary section and to withdraw said gas from said second capillary section, said conduit means extending externally of said shielding means and being adapted to be connected into a gas flow system.

References Cited

UNITED STATES PATENTS

| | | | |
|---|---|---|---|
| 3,349,619 | 10/1967 | Millar | 73—205 |
| 2,591,084 | 4/1952 | Martin | 73—28 |
| 2,971,368 | 2/1961 | Flumerfelt et al. | 73—25 |
| 3,194,054 | 7/1965 | Deaton et al. | 73—25 |

RICHARD C. QUEISSER, Primary Examiner

C. E. SNEE III, Assistant Examiner